(12) United States Patent
Shin et al.

(10) Patent No.: US 8,137,859 B2
(45) Date of Patent: Mar. 20, 2012

(54) MEMBRANE-ELECTRODE ASSEMBLY FOR FUEL CELL, METHOD FOR MANUFACTURING THE SAME, AND FUEL CELL SYSTEM INCLUDING THE SAME

(75) Inventors: Chan-Gyun Shin, Yongin-si (KR); Sang-Il Han, Yongin-si (KR); In-Hyuk Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 943 days.

(21) Appl. No.: 11/741,240

(22) Filed: Apr. 27, 2007

(65) Prior Publication Data

US 2007/0254207 A1    Nov. 1, 2007

(30) Foreign Application Priority Data

Apr. 28, 2006 (KR) .................. 10-2006-0038798

(51) Int. Cl.
 *H01M 4/36* (2006.01)

(52) U.S. Cl. ........ 429/484; 429/483; 429/503; 429/522; 429/524; 429/526

(58) Field of Classification Search .......... 429/483, 429/484, 503, 522, 523, 524, 526, 463, 464, 429/534

See application file for complete search history.

(56) References Cited

U.S. PATENT DOCUMENTS

| | | | |
|---|---|---|---|
| 5,399,184 A * | 3/1995 | Harada | 29/623.4 |
| 2003/0087145 A1* | 5/2003 | Yasumoto et al. | 429/44 |
| 2005/0064276 A1* | 3/2005 | Sugawara et al. | 429/42 |
| 2005/0266291 A1* | 12/2005 | Watakabe | 429/33 |
| 2005/0277007 A1* | 12/2005 | Yoshitake et al. | 429/44 |
| 2006/0019146 A1* | 1/2006 | Yoshitake et al. | 429/44 |
| 2006/0287497 A1* | 12/2006 | Tayanagi et al. | 528/391 |

FOREIGN PATENT DOCUMENTS

JP    2005-259513    9/2005

OTHER PUBLICATIONS

KIPO Office action dated Feb. 14, 2011, for Korean priority Patent application 10-2006-0038798, noting listed references in this IDS.
Patent Abstracts of Japan and English machine translation of Japanese Publication 2005-259513 listed above, 12 pages.

* cited by examiner

*Primary Examiner* — Patrick Ryan
*Assistant Examiner* — Ben Lewis
(74) *Attorney, Agent, or Firm* — Christie, Parker & Hale, LLP (57) ABSTRACT

A membrane-electrode assembly for a fuel cell including an anode and a cathode disposed to face each other and a polymer electrolyte membrane disposed therebetween. The anode and the cathode include a conductive electrode substrate and a catalyst layer formed thereon. The catalyst layer includes ion conductive polymer particles and a catalytic metal. The resulting membrane-electrode assembly has an increased driving voltage.

25 Claims, 5 Drawing Sheets

MEMBRANE-ELECTRODE ASSEMBLY FOR FUEL CELL, METHOD FOR MANUFACTURING THE SAME, AND FUEL CELL SYSTEM INCLUDING THE SAME

CROSS-REFERENCE TO RELATED APPLICATIONS

This application claims the benefit of Korean Application No. 2006-38798, filed Apr. 28, 2006, in the Korean Intellectual Property Office, the disclosure of which is incorporated herein by reference.

BACKGROUND OF THE INVENTION

1. Field of the Invention

Aspects of the present invention relate to a membrane-electrode assembly for a fuel cell, a method of manufacturing the same, and a fuel cell system including the same. More particularly, aspects of the present invention relate to a membrane-electrode assembly for a fuel cell that can implement fuel supply and release of a reaction product, and increase catalyst activity, and thereby can improve power characteristics of a fuel cell, a method of manufacturing the same, and a fuel cell system including the same.

2. Description of the Related Art

A fuel cell is a power generation system to produce electrical energy through an electrochemical redox reaction of an oxidant and hydrogen in a hydrocarbon-based material such as methanol, ethanol, or natural gas.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell is advantageous as the PEMFC provides a high energy density, but the PEMFC requires the need to carefully handle hydrogen gas and requires accessory facilities, such as a fuel reforming processor for reforming methane or methanol, natural gas, and the like to produce hydrogen for the fuel gas.

On the contrary, the direct oxidation fuel cell has a lower energy density than that of the PEMFC, but the DOFC requires fuel that is easy to handle, is capable of operating at room temperature due to its low operation temperature, and does not need additional fuel reforming processors.

In the above-described fuel cells, the fuel cell stack that generates electricity substantially includes several to scores of unit cells stacked in multiple layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane disposed between them. The MEAs are disposed between adjacent bipolar plates to form the fuel cell stack.

A fuel is supplied to the anode and absorbed in a catalyst thereof, and the fuel is oxidized to produce protons and electrons. The electrons are transferred to the cathode via an external circuit, and the protons are transferred to the cathode through a polymer electrolyte membrane. An oxidant is supplied to the cathode, and the oxidant, protons, and electrons are reacted using a catalyst at the cathode to produce water. As the electrons flow from the anode to the cathode through the external circuit, the electrons produce useable electricity.

SUMMARY OF THE INVENTION

Aspects of the present invention provide a membrane-electrode assembly that can implement fuel supply and release of a reaction product and increase catalyst activity to thereby improve the power characteristics of a fuel cell.

Aspects of the present invention provide a method of manufacturing a membrane-electrode assembly.

Aspects of the present invention further provide a fuel cell system that includes a membrane-electrode assembly.

According to aspects of the present invention, a membrane-electrode assembly for a fuel cell including an anode and a cathode facing each other and a polymer electrolyte membrane interposed therebetween is provided. The anode and the cathode each include a conductive electrode substrate and a catalyst layer formed thereon. The catalyst layer includes an ion conductive polymer particle and a catalytic metal.

The ion conductive polymer particle has an average particle diameter of more than or equal to 10 nm. According to one embodiment, the ion conductive polymer particle has an average particle diameter ranging from 10 to 1000 nm, inclusive. According to another embodiment, the ion conductive polymer particle has an average particle diameter ranging from 10 nm to 500 nm, inclusive. The ion conductive polymer resin has a weight average molecule weight ranging from 500 to 300,000, inclusive.

The catalyst layer includes an ion conductive polymer particle and a catalytic metal in a weight ratio of 5:95 to 20:80, inclusive. The catalyst layer has a porosity of 1 to 35 volume % based on the total volume thereof. According to aspects of the present invention, a method of manufacturing a membrane-electrode assembly includes providing a catalyst layer composition including an ion conductive polymer particle and a catalytic metal, and coating an electrode substrate or a polymer electrolyte membrane with the catalyst layer composition to form a catalyst layer.

According to aspects of the present invention, a fuel cell system including an electricity generating element that includes a membrane-electrode assembly and a separator positioned at each side of the membrane-electrode assembly, a fuel supplier that supplies the electricity generating element with a fuel, and an oxidant supplier that supplies the electricity generating element with an oxidant, is provided.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Generally, a catalyst layer of a membrane-electrode assembly is formed by applying a composition prepared by dissolving a catalytic metal and a binder in a solvent. The catalyst layer includes pores. The pores of the catalyst layer promote the activity of an electrode catalyst, supply fuel gas, and discharge a reaction product. The pores of the catalyst layer have a great influence on the performance of a fuel cell.

Figure 1:
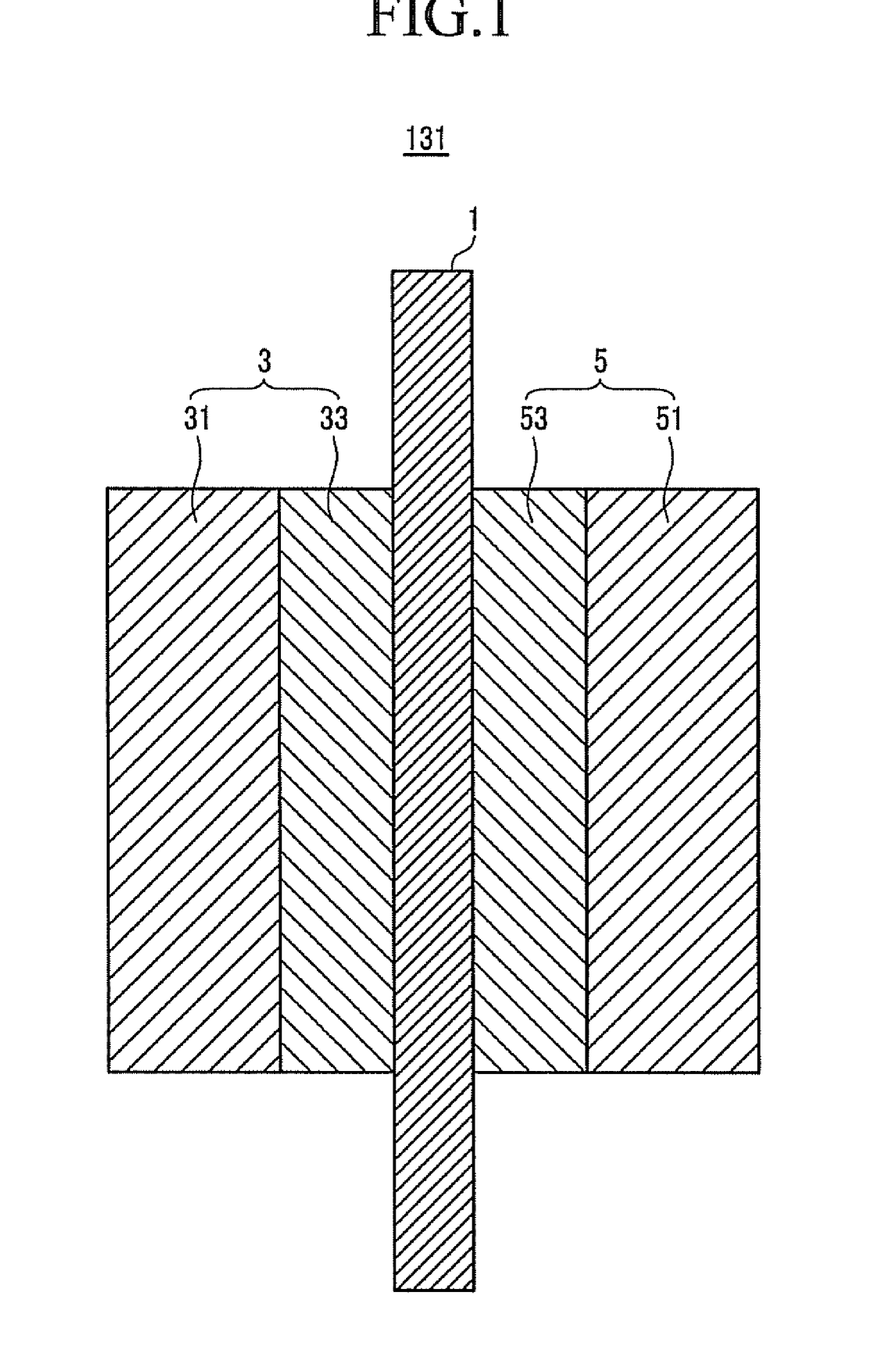
FIG. 1 is a cross-sectional view showing a membrane-electrode assembly according to aspects of the present invention.

According to aspects of the present invention, the catalyst layer includes an ion conductive polymer particle to thereby promote the generation of the pores in the catalyst layer. Also, aspects of the present invention increase the porosity by modifying the structure of the pores to thereby supply fuel into the catalyst layer smoothly and promote the activity of the catalyst. Accordingly, the output characteristic of the fuel cell can be improved. FIG. 1 is a schematic cross-sectional view showing a membrane-electrode assembly 131 according to aspects of the present invention. Hereinafter, a membrane-electrode assembly 131 according to aspects of the present invention is described in detail with reference to the drawing.

The membrane-electrode assembly 131 generates electrical energy through oxidation of a fuel and reduction of an oxidant. One or several membrane-electrode assemblies are stacked in a fuel cell stack.

The membrane-electrode assembly 131 includes an anode 3 and a cathode 5 facing each other, and a polymer electrolyte membrane 1 disposed between the anode 3 and the cathode 5.

At least one of the anode 3 and the cathode 5 respectively includes a catalyst layer 33 and 53 and an electrode substrate 31 and 51 supporting the catalyst layer 33 and 53.

The catalyst layers 33 and 53 provide catalytic help to related reactions, i.e., oxidation of the fuel and reduction of an oxidant. The catalyst layers 33 and 53 include an ion conductive polymer particle and a catalytic metal.

Figure 2:
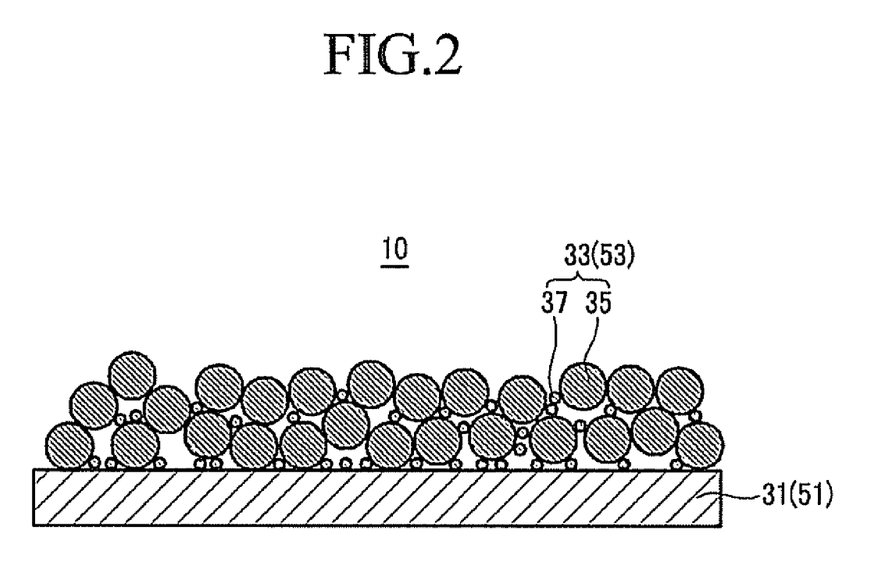
FIG. 2 is a cross-sectional view showing an electrode according to aspects of the present invention.
Figure 3:
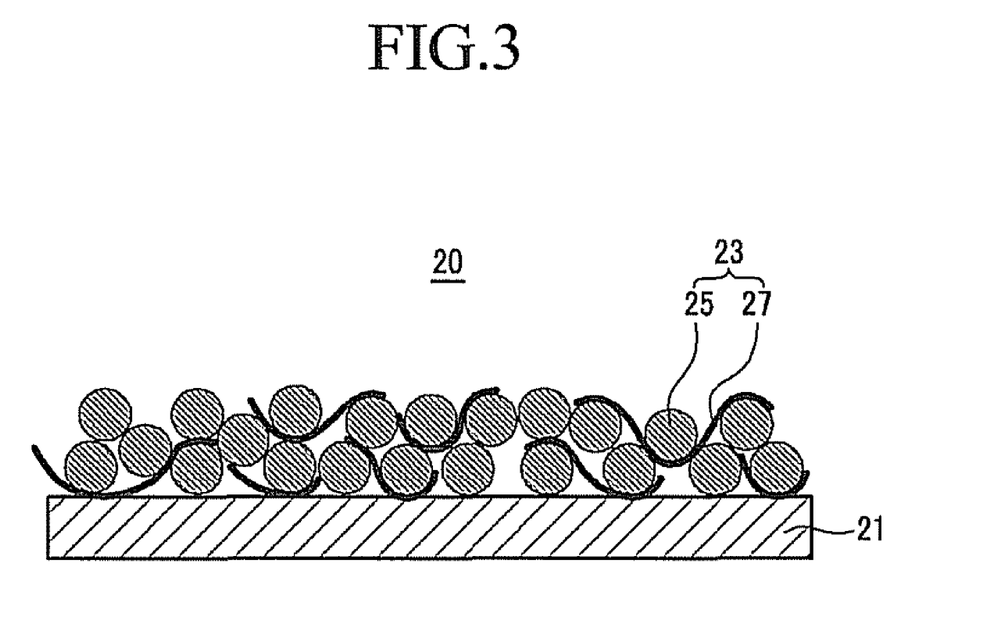
FIG. 3 is a cross-sectional view showing an electrode according to the related art.

FIG. 2 is a cross-sectional view showing an electrode 10 of a fuel cell prepared according to aspects of the present invention. As shown in FIG. 2, the electrode 10 may represent the anode 3 or the cathode 5 from FIG. 1 and includes the catalyst layer 33 or 53, respectively formed on the electrode substrates 31 or 51. The catalyst layers 33 and 53 include a catalytic metal 35 and ion conductive polymer particles 37. On the contrary, a conventional electrode 20, shown in FIG. 3, includes a catalyst layer 23 disposed on an electrode substrate 21 in which a catalytic metal 25 in the catalyst layer 23 is bound by a binder 27.

The ion conductive polymer particles 37 improves adherence of the catalyst layers and proton transfer. Furthermore, the ion conductive polymer particles 37 promote the generation of pores in the catalyst layers 33 and 53 and increase the porosity by modifying the pore structure to thereby increase the catalyst activity. The increased porosity makes it easier to supply the fuel to the catalyst layers 33 and 53 and to discharge reaction products from the catalyst layers 33 and 53.

The ion conductive polymer particles 37 may be prepared by dispersing an ion conductive polymer in a solvent, drying the mixture, and pulverizing the resultant.

The ion conductive polymer may be a polymer resin having a cation exchange group selected from the group consisting of a sulfonic acid group, a carboxylic acid group, a phosphoric acid group, a phosphonic acid group, and derivatives or combinations thereof. The ion conductive polymer may have the cation exchange group at a side chain.

Non-limiting examples of the polymer include at least one proton conductive or ion conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive or ion conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The ion conductive polymer may have a weight average molecular weight ranging from 500 to 300,000, inclusive, specifically, from 1,000 to 100,000, inclusive. When the weight average molecular weight of the ion conductive polymer is smaller than 500, an ion conductive effect is not sufficient. When the weigh average molecular weight of the ion conductive polymer 37 exceeds 300,000, it is difficult to prepare the ion conductive polymer particles 37 from the ion conductive polymer.

The ion conductive polymer particles 37 may have an average particle diameter of or over 10 nm, and, more specifically, the ion conductive polymer particles 37 may have an average particle diameter of 10 to 500 nm, inclusive. When the average particle diameter of the ion conductive polymer particles 37 is smaller than 10 nm, the conductive polymer particles 37 do not sufficiently mix with the catalyst, which is not desirable.

Any substance that can be involved in the reactions of a fuel cell and functions as a catalyst can be the catalytic metal 35. Representative examples of the catalytic metal 35 are platinum-based catalysts. Platinum-based catalysts include platinum, ruthenium, osmium, a platinum-ruthenium alloy, a platinum-osmium alloy, a platinum-palladium alloy, a platinum-M alloy, and combinations thereof, where M is a transition element selected from the group consisting of Ga, Ti, V, Cr, Mn, Fe, Co, Ni, Cu, Zn, Sn, Mo, W, Rh, Ru, and combinations thereof. Representative examples of the catalytic metals 37 include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a catalytic metal 37 may be used in a form of a metal itself (black catalyst) or can be used while being supported on a carrier. The carrier may include carbon-based materials such as graphite, denka black, ketjen black, acetylene black, carbon nanotube, carbon nanofiber, carbon nanowire, carbon nanoball, and activated carbon, or an inorganic material particulate such as alumina, silica, zirconia, and titania.

The catalyst layer includes the ion conductive polymer particles and the catalytic metal in a weight ratio of 5:95 to 20:80, inclusive, more specifically, 10:90 to 13:87, inclusive. Within the content range, the proton conductivity and the electric conductivity are balanced, and an appropriate porosity can be achieved. Out of the content range, however, an electric resistance or a proton transfer resistance is increased, or the pores are not formed appropriately, which is undesirable.

The catalyst layers 33 and 53 of the anode 3 and the cathode 5 may further include a binder resin to improve adherence and proton transfer.

The binder resin may be a proton conductive polymer resin having a cation exchange group selected from the group consisting of a sulfonic acid group, a carboxylic acid group, a phosphoric acid group, a phosphonic acid group, and derivatives thereof. The ion conductive polymer may have the cation exchange group at a side chain. Non-limiting examples of the polymer include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. According to aspects of the current invention, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The binder resin may be used singularly or as a mixture. The binder resin may also be used along with a non-conductive polymer to improve adherence between the polymer electrolyte membrane and the catalyst layer. The amount of the binder resin may be adjusted to its usage purpose.

Non-limiting examples of the non-conductive polymer include polytetrafluoroethylene (PTFE), tetrafluoroethylene-hexafluoropropylene copolymers (FEP), tetrafluoroethylene-perfluoroalkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

Since the catalyst layers 33 and 53 having the above-described composition include ion conductive polymer particles 37, they exhibit excellent porosity due to the generation of pores and a modified pore structure. Specifically, the catalyst layers 33 and 53 have a porosity ranging from 1 to 35 volume % with respect to the entire volume of the catalyst layers 33 and 53, and, more specifically, the catalyst layers 33 and 53 have a porosity of 10 to 15 volume %. When the porosity of the catalyst layers 33 and 53 is lower than 1 volume %, the reactant cannot flow smoothly into the catalyst layers 33 and 53, which is not desirable. When the porosity exceeds 35 volume %, the electric resistance is increased, which is also not desirable.

The catalyst layers 33 and 53 of the anode 3 and the cathode 5 that have the above-described structure are disposed on top of the electrode substrates 31 and 51, respectively.

The electrode substrates 31 and 51 support the electrode and provide a path for transferring the fuel and the oxidant to the catalyst. In one embodiment, the electrode substrates 31 and 51 are formed from a material such as carbon paper, carbon cloth, or carbon felt, or a metal cloth that includes a metal film formed on a surface of a porous cloth film or a cloth composed of polymer fibers. The electrode substrates 31 and 51 are not limited thereto.

The electrode substrates 31 and 51 may include water-repellent or hydrophobic fluoro-based resins to prevent the deterioration of a diffusion efficiency due to the water generated during operation of a fuel cell. The fluoro-based resin may include polytetrafluoroethylene, polyvinylidene fluoride, polyhexafluoropropylene, polyperfluoroalkylvinylether, polyperfluorosulfonylfluoride alkoxy vinyl ether, fluorinated ethylene propylene, polychlorotrifluoroethylene, or fluoroethylene polymers, but the fluoro-based resin is not limited thereto.

A microporous layer (MPL) can be added between the aforementioned electrode substrates 31 and 51 and the catalyst layers 33 and 53, respectively, to increase diffusion of the reactant. The microporous layer generally includes conductive powders with a certain particle diameter. The conductive powders may include, but is not limited to, carbon powder, carbon black, acetylene black, activated carbon, carbon fiber, fullerene, nano-carbon, and combinations thereof. The nano-carbon may include a material such as carbon nanotubes, carbon nanofiber, carbon nanowire, carbon nanohorns, carbon nanorings, and combinations thereof.

The microporous layer is formed by coating a composition including a conductive powder, a binder resin, and a solvent on the electrode substrates 31 and 51. The binder resin may include, but is not limited to, polytetrafluoroethylene, polyvinylidene fluoride, polyvinyl alcohol, cellulose acetate, polyhexafluoropropylene, polyperfluoroalkylvinyl ether, polyperfluorosulfonylfluoride alkoxy vinyl ether, and copolymers thereof. The solvent may include, but is not limited to, an alcohol such as ethanol, isopropyl alcohol, n-propylalcohol, butanol, etc., water, dimethyl acetamide, dimethyl sulfoxide, and N-methylpyrrolidone. The coating method may include, but is not limited to, screen printing, spray coating, doctor blade methods, gravure coating, dip coating, silk screening, painting, and so on, depending on the viscosity of the composition.

The above-described electrode can be applicable as at least one of the anode 3 or the cathode 5. According to aspects of the current invention, the electrode is adopted as the cathode 3.

A membrane-electrode assembly 131 includes a polymer electrolyte membrane 1 disposed between the anode 3 and the cathode 5. The polymer electrolyte membrane 1 facilitates ion exchange by transferring the protons produced from the anode catalyst layer 33 to the cathode catalyst layer 53. The proton conductive polymer for the polymer electrolyte membrane 1 according to aspects of the present invention may be any polymer resin having a cation exchange group selected from the group consisting of a sulfonic acid group, a carboxylic acid group, a phosphoric acid group, a phosphonic acid group, and derivatives thereof.

Non-limiting examples of the polymer resin for the polymer electrolyte membrane 1 include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H in the proton conductive group of the proton conductive polymer can be replaced with Na, K, Li, Cs, or tetrabutylammonium. When the H is replaced with Na in an ion exchange group at the terminal end of the proton conductive group, NaOH is used. When the H is replaced with tetrabutyl ammonium, tetrabutyl ammonium hydroxide is used. K, Li, or Cs can also be replaced by using appropriate compounds.

The membrane-electrode assembly 131 having the above-described structure may be fabricated by preparing a catalyst layer forming composition including an ion conductive polymer particle and a catalytic metal, and coating one side of an electrode substrate or a polymer electrolyte membrane with the catalyst layer forming composition to thereby form a catalyst layer.

To describe the fabrication of the membrane-electrode assembly in detail, first, a catalyst layer-forming composition is prepared by dispersing ion conductive polymer particles and a catalytic metal in a solvent.

The ion conductive polymer particles and the catalytic metal are as described above, and the catalyst layer-forming composition includes the ion conductive polymer particles and the catalytic metal in a weight ratio of 5:95 to 20:80, inclusive, and, more specifically, in a weight ratio of 10:90 to 13:87, inclusive.

As for the solvent, an alcohol such as ethanol, isopropyl alcohol, ethanol, n-propylalcohol, and butanol, water, or a mixed solvent of alcohol and water may be used. Specifically, a mixed solvent of water and 2-propylalcohol may be used. The solvent may be included in the catalyst layer-forming composition as a balance. The solvent may be added in a quantity that can form the catalyst layer having an appropriate viscosity.

The catalyst layer-forming composition may further include a polymer resin having a cation exchange group as a binder resin to improve adherence of the catalyst layer and transfer protons. The binder resin is as described above.

Subsequently, one side of an electrode substrate and/or a polymer electrolyte membrane is coated with the prepared catalyst layer-forming composition to thereby form a catalyst layer.

The coating method may be one selected from the group consisting of spray coating, reverse rolling, direct rolling, gravure coating, screen printing, doctor blade's coating, dip-coating, silk screening, painting, slot die coating, and a combination thereof, according to the viscosity of the composition; but, the coating method is not limited thereto. More specifically, the coating method may be spray coating.

When the catalyst layer is formed on the polymer electrolyte membrane, the electrode substrate is bound to the polymer electrolyte membrane by the catalyst layer to thereby fabricate a membrane-electrode assembly. When the catalyst layer is formed on an electrode substrate, the electrode substrate with the catalyst layer is bound to at least one side of the polymer electrolyte membrane to thereby fabricate a membrane-electrode assembly. The catalyst layer may be formed on the anode or cathode electrode substrate, on both the anode and the cathode substrate, or on one or both sides of the polymer electrolyte membrane.

The membrane-electrode assembly according to aspects of the current invention includes an ion conductive polymer particle in the catalyst layer, pores are formed in the catalyst layer and the structure of the pores is modified to thereby supply a hydrocarbon-based fuel and discharge a reaction product, such as water and carbon dioxide, smoothly. Also, the membrane-electrode assembly according to aspects of the present invention can increase the activity of a catalyst involved in the oxidation of the hydrocarbon-based fuel and oxygen-reduction reaction. Consequently, the membrane-electrode assembly according to aspects of the current invention can improve the output of the fuel cell.

According to aspects of the present invention, a fuel cell system including the above-described membrane-electrode assembly is provided. A fuel cell system according to aspects of the present invention includes at least one electricity generating element, a fuel supplier, and an oxidant supplier.

The electricity generating element includes a membrane-electrode assembly that includes a polymer electrolyte membrane, a cathode and an anode positioned at both sides of the polymer electrolyte membrane, and separators positioned at both sides of the membrane-electrode assembly. The electricity generating element generates electricity through oxidation of a fuel and reduction of an oxidant.

The fuel supplier supplies the electricity generating element with a fuel including hydrogen, and the oxidant supplier supplies the electricity generating element with an oxidant. The oxidant includes oxygen or air.

The fuel includes a liquid or gaseous hydrogen, or a hydrocarbon-based fuel such as methanol, ethanol, propanol, butanol, or natural gas.

Figure 4:
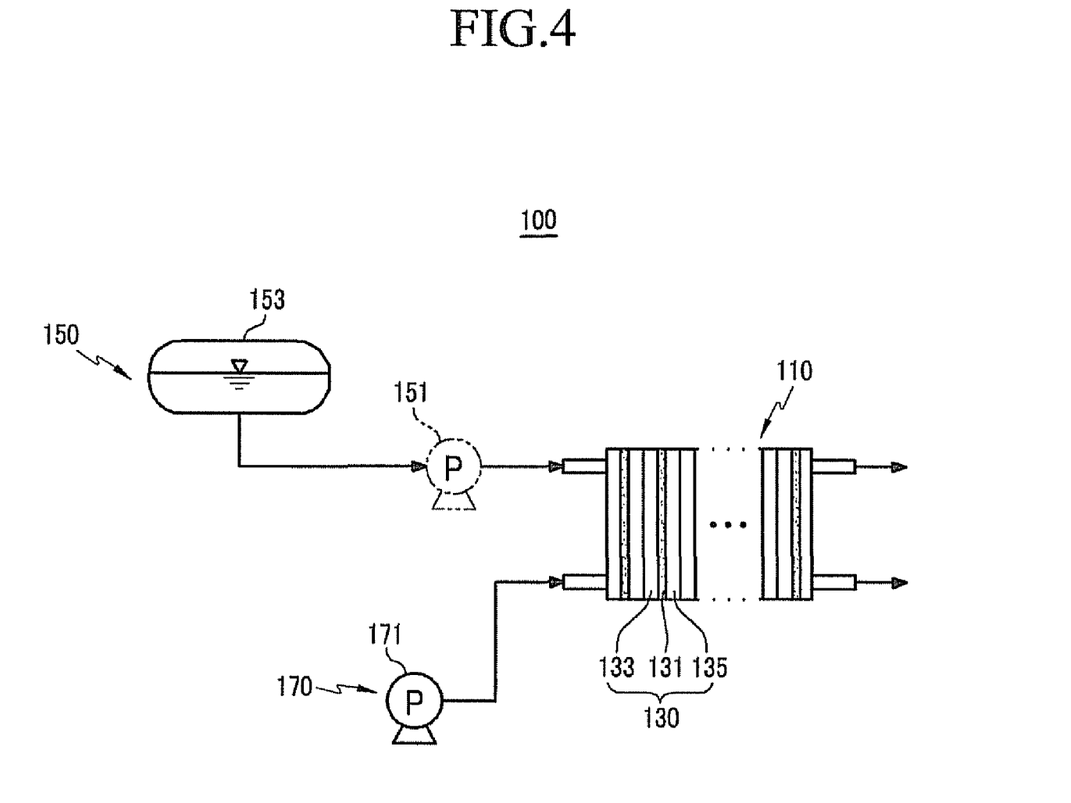
FIG. 4 is a schematic diagram showing the structure of a fuel cell system according to aspects of the present invention.

FIG. 4 shows a schematic structure of a fuel cell system 100 that will be described in detail with reference to this accompanying drawing, as follows. FIG. 4 illustrates a fuel cell system 100 wherein a fuel and an oxidant are provided to the electricity generating element 130 through pumps 151 and 171, but aspects of the present invention is not limited to such a structure. The fuel cell system according to aspects of the present invention alternatively includes a structure wherein a fuel and an oxidant are provided in a diffusion manner.

The fuel cell system 100 includes a stack 110 composed of at least one electricity generating element 130 that generates electrical energy through an electrochemical reaction of a fuel and an oxidant, a fuel supplier 150 to supply a fuel to the electricity generating element 130, and an oxidant supplier 170 to supply an oxidant to the electricity generating element 130.

In addition, the fuel supplier 150 is equipped with a tank 153 that stores the fuel, and a pump 151 that is connected therewith. The fuel pump 151 supplies the fuel stored in the tank 153 with a predetermined pumping power.

The oxidant supplier 170, which supplies the electricity generating element 130 of the stack 110 with an oxidant, is equipped with at least one pump 171 to supply the oxidant with a predetermined pumping power.

The electricity generating element 130 includes a membrane-electrode assembly 131 that oxidizes hydrogen or a fuel and reduces an oxidant, and separators 133 and 135 that are respectively positioned at opposite sides of the membrane-electrode assembly 131 and supply hydrogen or a fuel, and an oxidant, respectively. A stack 110 comprises at least one electricity generating element 130.

The following examples illustrate aspects of the present invention in more detail. However, it is understood that aspects of the present invention is not limited by these examples.

Example 1

Ion conductive polymer particles having an average particle diameter of 100 nm were prepared by drying and pulverizing 10 wt % of a NAFION® (which is produced by the DuPont Company, and has a weight average molecular weight of 100,000) water-dispersible solution.

A mixed catalyst was prepared by mixing Pt black (HISPEC® 1000, produced by the Johnson Matthey Company) and Pt/Ru black (HISPEC® 6000, produced by the Johnson Matthey Company) at a weight ratio of 5:5. 90 parts by weight of the mixed catalyst and 10 parts by weight of the ion conductive polymer particles were added to a solvent mixture prepared by mixing water and isopropyl alcohol at a weight ratio of 10:80. Subsequently, 40 parts by weight of the 10 wt % NAFION® (produced by the DuPont Company) water-dispersible solution was added to the solvent mixture and uniformly agitated by applying ultrasonic waves, to thereby prepare a catalyst layer-forming composition.

A cathode was prepared by spray coating a carbon paper substrate (cathode/anode=SGL 31BC/10DA; produced by the SGL Carbon Group) treated with tetrafluoroethylene (TEFLON®) with the catalyst layer forming composition. An anode was prepared by using PtRu black catalyst and performing the same preparation method. Herein, 6 mg/cm$^2$ catalyst layer was formed in the anode, and 4 mg/cm$^2$ catalyst layer was formed in the cathode.

Subsequently, a membrane-electrode assembly was fabricated by stacking the anode on one side of and the cathode on the other side of a commercial polymer electrolyte membrane for a fuel cell (NAFION® 115 Membrane, produced by the DuPont Company). The fabricated membrane-electrode assembly was disposed between gaskets, disposed again between two separators each having a gas flow channel and a cooling channel of predetermined shapes, and then compressed between copper end plates to thereby fabricate a single cell.

Example 2

A single cell was fabricated by the same method as Example 1, except that ion conductive polymer particles having an average particle diameter of 10 nm were prepared by using 10 wt % of a NAFION® (produced by DuPont Company and having a weight average molecular weight of 100,000) water-dispersible solution.

Example 3

A single cell was fabricated by the same method as Example 1, except that ion conductive polymer particles having an average particle diameter of 500 nm was prepared by using 10 wt % of a NAFION® (produced by DuPont Company and having a weight average molecular weight of 100,000) water-dispersible solution.

Example 4

A single cell was fabricated by the same method as Example 1, except that ion conductive polymer particles having an average particle diameter of 100 nm was prepared by using 10 wt % of a polyperfluorocarboxylic acid (having a weight average molecular weight of 100,000) water-dispersible solution.

Example 5

Ion conductive polymer particles having an average particle diameter of 100 nm were prepared by drying and pulverizing 10 wt % of a NAFION® (which is produced by the DuPont Company, and has a weight average molecular weight of 100,000) water-dispersible solution.

A mixed catalyst was prepared by mixing Pt black (HISPEC® 1000, produced by the Johnson Matthey Company) and Pt/Ru black (HISPEC®6000, produced by the Johnson Matthey Company) at a weight ratio of 5:5.70 parts by weight of the mixed catalyst and 30 parts by weight of the ion conductive polymer particles were added to a solvent mixture prepared by mixing water and isopropyl alcohol at a weight ratio of 10:80. Subsequently, 40 parts by weight of a 10 wt % NAFION® (produced by the DuPont Company) water-dispersible solution was added to the solvent mixture and uniformly agitated by applying ultrasonic waves to thereby prepare a catalyst layer-forming composition.

A cathode was prepared by spray coating a carbon paper substrate (cathode/anode=SGL 31BC/10DA; produced by the SGL Carbon Group) treated with tetrafluoroethylene (TEFLON®) with the catalyst layer forming composition. An anode was prepared by using PtRu black catalyst and performing the same preparation method. Herein, a 6 mg/cm$^2$ catalyst layer was formed in the anode, and a 4 mg/cm$^2$ catalyst layer was formed in the cathode.

Subsequently, a membrane-electrode assembly was fabricated by disposing the anode and the cathode on both sides of a commercial polymer electrolyte membrane for a fuel cell (NAFION® 115 Membrane, produced by the DuPont Company). The fabricated membrane-electrode assembly was disposed between gaskets, disposed again between two separators each having a gas flow channel and a cooling channel of predetermined shapes, and then compressed between copper end plates to thereby fabricate a single cell.

Example 6

A single cell was fabricated by the same method as Example 1, except that ion conductive polymer particles having an average particle diameter of 100 nm were prepared by using 10 wt % of a poly(2,2'-m-phenylene)-5,5'-bibenzimidazole (having a weight average molecular weight of 100,000) water-dispersible solution.

Example 7

A single cell was fabricated by the same method as Example 1, except that ion conductive polymer particles having an average particle diameter of 200 nm were prepared by using 10 wt % of the NAFION® (produced by DuPont Company and having a weight average molecular weight of 100,000) water-dispersible solution.

Comparative Example 1

A mixed catalyst was prepared by mixing Pt black (HISPEC® 1000, produced by the Johnson Matthey Company) and Pt/Ru black (HISPEC®6000, produced by the Johnson Matthey Company) at a weight ratio of 5:5.90 parts by weight of the mixed catalyst was added to a solvent mixture prepared by mixing water and isopropyl alcohol at a weight ratio of 10:80. Subsequently, 40 parts by weight of a NAFION® solution (NAFION® 1100EW produced by the DuPont Company) was added to the solvent mixture and uniformly agitated by applying ultrasonic waves, to thereby prepare a catalyst layer-forming composition.

A cathode was prepared by spray coating a carbon paper substrate (cathode/anode=SGL 31BC/10DA; produced by the SGL Carbon Group) treated with tetrafluoroethylene (TEFLON®) with the catalyst layer-forming composition. An anode was prepared by using PtRu black catalyst (HiSPEC® 6000, produced by the Johnson Matthey Company) and performing the same preparation method. Herein, a 6 mg/cm$^2$ catalyst layer was formed in the anode, and a 4 mg/cm$^2$ catalyst layer was formed in the cathode.

Subsequently, a membrane-electrode assembly was fabricated by disposing the anode and the cathode on both sides of a commercial polymer electrolyte membrane for a fuel cell (NAFION® 115 Membrane, produced by the DuPont Company). The fabricated membrane-electrode assembly was disposed between gaskets, disposed again between two separators each having a gas flow channel and a cooling channel of predetermined shapes, and then compressed between copper end plates to thereby fabricate a single cell.

Table 1 summarizes the differences between Examples 1 through 7 and Comparative Example 1.

TABLE 1

|  | Ion Conductive Polymer Particle Size (nm) | Ion Conductive Polymer Particles to Mixed Catalyst Ratio | Ion Conductive Polymer |
| --- | --- | --- | --- |
| Example 1 | 100 | 10:90 | Nafion |
| Example 2 | 10 | 10:90 | Nafion |
| Example 3 | 500 | 10:90 | Nafion |
| Example 4 | 100 | 10:90 | polyperfluorocarboxylic acid |
| Example 5 | 100 | 30:70 | Nafion |
| Example 6 | 100 | 10:90 | poly(2,2'-m-phenylene)-5,5'-bibenzimidazole |
| Example 7 | 200 | 10:90 | Nafion |
| Comparative Example 1 | n/a | 0:100 | Nafion |

Figure 5:
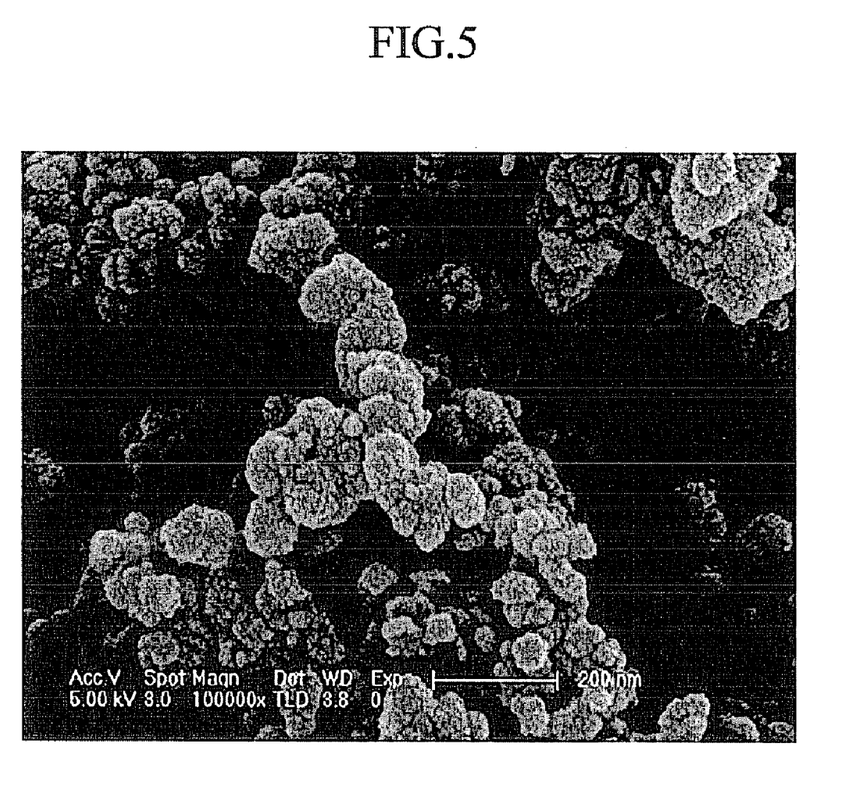
FIG. 5 is a scanning electron microscope photograph of the catalyst layer according to Example 7.

Porosity of the catalyst layers was measured with respect to the single cells prepared according to Examples 1 to 7 and Comparative Example 1. A scanning electron microscope photograph of the catalyst layer according to Example 7 was shown in FIG. 5. As shown in FIG. 5, the ion conductive polymer particles are present between the catalyst particles.

Single cells of Examples 1 to 5 and 7 and Comparative Example 1 were measured regarding voltage while operating at 70"C for 10 hours by inflowing 1M methanol and dry air into the cell. The measurement results of Examples 1 to 5 and 7 and Comparative Example 1 are shown in Table 2.

TABLE 2

|  | Porosity (volume %) | Driving voltage at 200 mA/cm$^2$ (V) |
| --- | --- | --- |
| Example 1 | 15 | 0.40 |
| Example 2 | 10 | 0.38 |
| Example 3 | 18 | 0.35 |
| Example 4 | 5 | 0.32 |
| Example 5 | 5 | 0.30 |
| Example 7 | 35 | 0.35 |
| Comparative Example 1 | 3 | 0.28 |

As shown in Table 2, the single cells of Examples 1 to 4, and 7, which included the ion conductive polymer particles, had a higher porosity and a higher driving voltage than those of the single cell prepared according to Comparative Example 1, which did not include ion conductive polymer particles, under the same driving conditions. It can be seen from the results that the fuel cells fabricated according to the present embodiment, which include the ion conductive polymer particles, have excellent output characteristics.

Example 5 included a mixing ratio of the ion conductive polymer particles to the catalyst (30:70) that was out of the mixing ratio range suggested (5:95 to 20:80, inclusive) according to aspects of the current invention. The single cell of Example 5 showed a higher porosity and a higher driving voltage than the single cell of Comparative Example 1, which did not include an ion conductive polymer particle. However, the porosity and driving voltage of Example 5 were lower than those of the single cells prepared according to Examples 1 to 4, and 7, which included the ion conductive polymer particles and a catalyst within the mixing ratio range according to aspects of the current invention. Further, Example 6 demonstrates the relationship between the ion conductive polymer, the particle size of the ion conductive polymer, and the driving voltage. To have an improved output of a fuel cell according to aspects of the current invention in which the ion conductive polymer particles comprise poly(2,2'-m-phenylene)-5,5'-bibenzimidazole, the ion conductive polymer particles could be larger to increase the amount of ion conductive polymer in the catalyst layer, the porosity could be increased so as to increase flow of the products and reactants through the catalyst layer, or the ion conductive polymer particle to metal catalyst ratio could be increased in the catalyst layer so as to provide a higher driving voltage.

It can be seen from the above results that the mixing ratio of the ion conductive polymer particles to the catalyst suggested, in the range of 5:95 to 20:80, inclusive, in the present embodiment is the optimized ratio.

According to the present embodiment, pores are formed by the ion conductive polymer particles in the catalyst layer of the membrane-electrode assembly. Therefore, it is possible to smoothly supply fuel and discharge reaction products and increase the activity of the catalyst to thereby improve output of the fuel cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A membrane-electrode assembly for a fuel cell, comprising:
   an anode and a cathode facing each other; and
   a polymer electrolyte membrane disposed between the anode and the cathode,
   wherein at least one of the anode and the cathode comprises an electrode substrate coated with a catalyst layer consisting of a uniform mixture of ion conductive polymer particles, a catalytic metal, and optionally a binder resin;
   wherein the icon conductive polymer particles have an average particle diameter ranging from 10 to 1000 nm, inclusive; and
   wherein the ion conductive polymer particles comprise an ion conductive polymer resin having a weight average molecule weight ranging from 500 to 300,000, inclusive.

2. The membrane-electrode assembly of claim 1, wherein the ion conductive polymer resin has a cation exchange group selected from the group consisting of a sulfonic acid group, a carboxylic acid group, a phosphoric acid group, a phosphonic acid group, and derivatives or combinations thereof.

3. The membrane-electrode assembly of claim 1, wherein the catalytic metal comprises at least one selected from the group consisting of platinum, ruthenium, osmium, a platinum-ruthenium alloy, a platinum-osmium alloy, a platinum-palladium alloy, a platinum-M alloy, and combinations thereof, in which M is a transition element selected from the group consisting of Ga, Ti, V, Cr, Mn, Fe, Co, Ni, Cu, Zn, Sn, Mo, W, Rh, Ru, and combinations thereof.

4. The membrane-electrode assembly of claim 1, wherein the catalyst layer comprises ion conductive polymer particles and a catalytic metal in a weight ratio of between 5:95 and 13:87, inclusive.

5. The membrane-electrode assembly of claim 4, wherein the ion conductive polymer particles to metal catalyst ratio is between 10:90 and 13:87, inclusive.

6. The membrane-electrode assembly of claim 1, wherein the catalyst layer further comprises a binder resin.

7. The membrane-electrode assembly of claim 6, wherein the binder resin comprises a polymer resin having a cation exchange group selected from the group consisting of a sulfonic acid group, a carboxylic acid group, a phosphoric acid group, a phosphonic acid group, and derivatives or combinations thereof.

8. The membrane-electrode assembly of claim 1, wherein the catalyst layer has a porosity of 1 to 35 volume %, inclusive, with respect to the total volume of the catalyst layer.

9. The membrane-electrode assembly of claim 1, wherein the catalyst layer is a cathode catalyst layer.

10. The membrane-electrode assembly of claim 1, wherein the catalyst layer of the at least one of the anode and the cathode is disposed on the polymer electrolyte membrane.

11. The membrane-electrode assembly of claim 1, wherein the ion conductive polymer resin has a weight average molecule weight ranging from 1,000 to 100,000, inclusive.

12. A method of manufacturing a membrane-electrode assembly, comprising: forming a catalyst layer composition consisting of a uniform mixture of ion conductive polymer particles, a catalytic metal, a solvent or solvent mixture, and optionally a binder resin; and coating an electrode substrate or a polymer electrolyte membrane with the catalyst layer composition to form a catalyst layer;
wherein the ion conductive polymer particles have an average particle diameter of greater than or equal to 10 nm; and
wherein the ion conductive polymer particles comprise an ion conductive polymer resin having a weight average molecule weight ran in from 500 to 300,000, inclusive.

13. The method of claim 12, wherein the ion conductive polymer resin has a cation exchange group selected from the group consisting of a sulfonic acid group, a carboxylic acid group, a phosphoric acid group, a phosphonic acid group, and derivatives thereof.

14. The method of claim 12, wherein the catalyst layer composition comprises ion conductive polymer particles and a catalytic metal in a weight ratio of between 5:95 and 13:87, inclusive.

15. A fuel cell system, comprising: an electricity generating element, comprising: a membrane-electrode assembly, comprising: an anode and a cathode facing each other, and a polymer electrolyte membrane disposed between the anode and the cathode; a fuel supplier to supply a fuel to the electricity generating element; an oxidant supplier to supply an oxidant to the electricity generating element; and separators disposed on each side of the membrane-electrode assembly, wherein at least one of the anode and the cathode comprises an electrode substrate coated with a catalyst layer consisting of a uniform mixture of ion conductive polymer particles, a catalytic metal, and optionally a binder resin,
wherein the ion conductive polymer particles have an average article diameter ranging from 10 to 500 nm, inclusive; and
wherein the ion conductive polymer particles comprise an ion conductive polymer resin having a weight average molecule weight ranging from 500 to 300,000, inclusive.

16. The fuel cell system of claim 15, wherein the ion conductive polymer resin has a cation exchange group selected from the group consisting of a sulfonic acid group, a carboxylic acid group, a phosphoric acid group, a phosphonic acid group, and derivatives or combinations thereof.

17. The fuel cell system of claim 15, wherein the catalytic metal comprises at least one selected from the group consisting of platinum, ruthenium, osmium, a platinum-ruthenium alloy, a platinum-osmium alloy, a platinum-palladium alloy, a platinum-M alloy, and combinations thereof, in which M is a transition element selected from the group consisting of Ga, Ti, V, Cr, Mn, Fe, Co, Ni, Cu, Zn, Sn, Mo, W, Rh, Ru, and combinations thereof.

18. The fuel cell system of claim 15, wherein the catalyst layer comprises ion conductive polymer particles and a catalytic metal in a weight ratio of between 5:95 and 13:87, inclusive.

19. The fuel cell system of claim 15, wherein the catalyst layer further comprises a binder resin.

20. The fuel cell system of claim 19, wherein the binder resin comprises a polymer resin having a cation exchange group selected from the group consisting of a sulfonic acid group, a carboxylic acid group, a phosphoric acid group, a phosphonic acid group, and derivatives or combinations thereof.

21. The fuel cell system of claim 15, wherein the catalyst layer has a porosity of 1 to 35 volume %, inclusive, with respect to the total volume of the catalyst layer.

22. The fuel cell system of claim 15, wherein the catalyst layer is a cathode catalyst layer.

23. A membrane-electrode assembly, comprising: an anode; a cathode; a polymer electrolyte membrane disposed between the anode and the cathode; and a catalyst layer disposed between the polymer electrolyte membrane and at least one of the anode and the cathode, wherein the catalyst layer consists of a uniform mixture of ion conductive polymer particles, a metallic catalyst, and optionally a binder resin.

24. The membrane-electrode assembly of claim 23, wherein the catalyst layer is disposed between the polymer electrolyte membrane and both of the anode and the cathode.

25. An electrode for a fuel cell, comprising: an electrode substrate; and a catalyst layer coated on the electrode substrate, wherein the catalyst layer consists of a uniform mixture of ion conductive polymer particles, a metallic catalyst, and optionally a binder resin.

* * * * *

UNITED STATES PATENT AND TRADEMARK OFFICE
CERTIFICATE OF CORRECTION

PATENT NO.        : 8,137,859 B2
APPLICATION NO.   : 11/741240
DATED             : March 20, 2012
INVENTOR(S)       : Chan-Gyun Shin et al.

It is certified that error appears in the above-identified patent and that said Letters Patent is hereby corrected as shown below:

In the Claims

Column 12, Claim 1, line 39        Delete "icon"
                                   Insert -- ion --

Column 13, Claim 12, line 30       Delete "ran in"
                                   Insert -- ranging --

Column 14, Claim 15, line 2        Delete "article"
                                   Insert -- particle --

Signed and Sealed this
Twentieth Day of August, 2013

Teresa Stanek Rea
*Acting Director of the United States Patent and Trademark Office*